(12) United States Patent
Deisher

(10) Patent No.: US 11,755,901 B2
(45) Date of Patent: Sep. 12, 2023

(54) DYNAMIC QUANTIZATION OF NEURAL NETWORKS

(71) Applicant: Intel Corporation, Santa Clara, CA (US)

(72) Inventor: Michael E. Deisher, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 1517 days.

(21) Appl. No.: 15/857,438

(22) Filed: Dec. 28, 2017

(65) Prior Publication Data
US 2019/0042935 A1 Feb. 7, 2019

(51) Int. Cl.
| | | |
|---|---|---|
| *G06F 5/01* | (2006.01) | |
| *G06N 3/08* | (2023.01) | |
| *G06F 7/57* | (2006.01) | |
| *G06F 7/544* | (2006.01) | |
| *G06N 3/063* | (2023.01) | |
| *G06N 3/02* | (2006.01) | |
| *G06N 3/044* | (2023.01) | |
| *G06N 3/045* | (2023.01) | |
| *G06N 3/048* | (2023.01) | |
| *G06F 7/02* | (2006.01) | |

(52) U.S. Cl.
CPC ............... *G06N 3/08* (2013.01); *G06F 5/01* (2013.01); *G06F 7/5443* (2013.01); *G06F 7/57* (2013.01); *G06N 3/02* (2013.01); *G06N 3/044* (2023.01); *G06N 3/045* (2023.01); *G06N 3/048* (2023.01); *G06N 3/063* (2013.01); *G06F 7/023* (2013.01)

(58) Field of Classification Search
CPC ........... G06F 5/01; G06F 7/5443; G06N 3/02; G06N 3/0445; G06N 3/0454
See application file for complete search history.

(56) References Cited

U.S. PATENT DOCUMENTS

2018/0322607 A1* 11/2018 Mellempudi ............ G06F 17/16
2019/0102671 A1* 4/2019 Cohen ....................... G06F 16/17

* cited by examiner

*Primary Examiner* — Michael D. Yaary
(74) *Attorney, Agent, or Firm* — HANLEY, FLIGHT AND ZIMMERMAN, LLC

(57) ABSTRACT

An apparatus for applying dynamic quantization of a neural network is described herein. The apparatus includes a scaling unit and a quantizing unit. The scaling unit is to calculate an initial desired scale factors of a plurality of inputs, weights and a bias and apply the input scale factor to a summation node. Also, the scaling unit is to determine a scale factor for a multiplication node based on the desired scale factors of the inputs and select a scale factor for an activation function and an output node. The quantizing unit is to dynamically requantize the neural network by traversing a graph of the neural network.

25 Claims, 6 Drawing Sheets

DYNAMIC QUANTIZATION OF NEURAL NETWORKS

BACKGROUND ART

Neural networks are often developed and trained using floating point arithmetic. In particular, the weights and biases modified during the training of neural networks are adjusted according to very small numbers represented by floating point values. These networks can occupy a large portion of memory. Further, these large networks can use extensive computational resources to complete calculations associated with the neural network. For at least these reasons, neural networks are often quantized to integer neural networks to reduce the size of the network as well as the computational resources needed to execute the neural network.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

Figure 1:
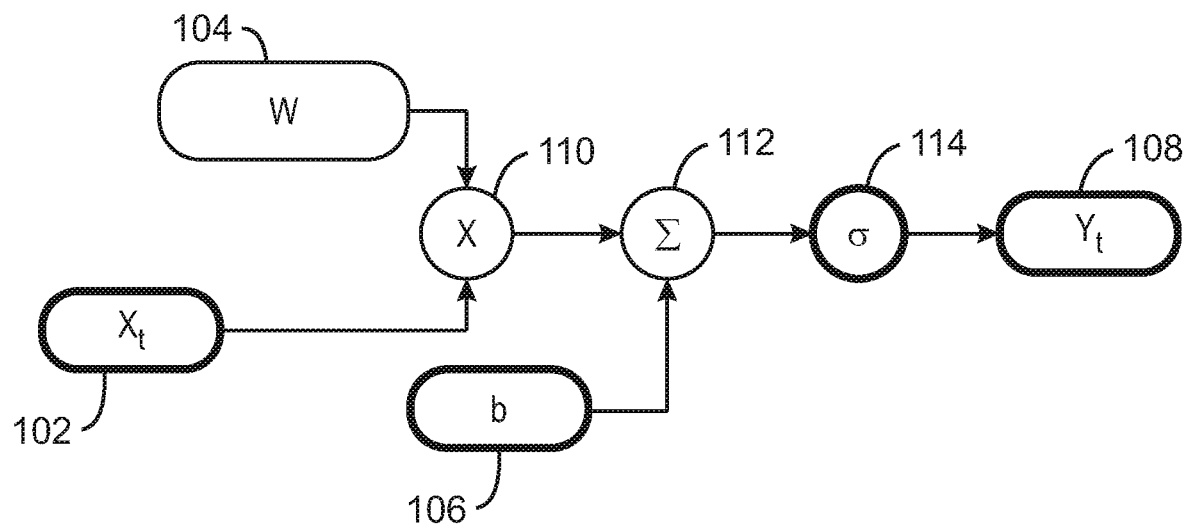
FIG. 1 is an affine layer computational graph.

Several types of neural networks can be quantized into integer neural networks. These networks may consist of various layers. The layers may be, for example, a convolutional neural network (CNN) layer, a fully connected neural network (FCNN) or affine layer, a recurrent neural network (RNN) layer, or a long short-term memory (LTSM) neural network layer. The various types of neural network layers may be combined into a single network.

The neural networks are often trained using floating point arithmetic, then quantized into integer neural networks. The accuracy of integer neural networks depends on, at least in part, minimizing the quantization error of the neural network parameters as well as the inputs to the network. As used herein, a quantization error describes the error present when quantizing a floating point set of values to an integer set of values. In some cases, elaborate iterative quantization procedures based on the specific set of expected inputs may be used to reduce quantization error. However, if the integer network is operated on inputs whose input dynamic range differs significantly from the expected dynamic range, accuracy of the network outputs may suffer significantly.

Embodiments described herein provide dynamic quantization of neural networks. The quantization described herein enables an improved accuracy of the neural network at a reduced precision of the network layers. In embodiments, the neural network may be trained using floating point values, then quantized to an integer network. As used herein, training refers to determining various parameters of the neural network, such as biases and weights.

The present techniques represent a very lightweight procedure for dynamically quantizing neural networks (on-the-fly) so that the network is adjusted to the input dynamic range, eliminating the need to know anything about the input dynamic range in advance. In comparison to conventional techniques, the present techniques are more accurate across a wider range of inputs. The present techniques do not require access to the input features during network quantization. Moreover, the present techniques are lightweight such that they can be performed using a low power co-processor.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

FIG. 1 is an affine layer computational graph 100. In FIG. 1 an affine neural network consisting of a single "fully connected" layer is represented as the computational graph 100. The graph 100 includes a representation of data comprising inputs, outputs, and parameters. Circles of the graph 100 represent operations upon the data. In particular, the node $X_t$ 102 is an input array, W 104 is a weight matrix, b 106 is a bias vector, and $y_t$ 108 is the output array. The operation "x" 110 represents matrix-matrix multiplication, the operation designated by the Greek Capital Letter Sigma Σ 112 represents matrix summation, and the operation represented by the Greek Small Letter Sigma σ 114 represents the sigmoid activation function. Other activation functions include, but are not limited to, tanh, rectified linear unit (ReLU), and the like. Accordingly, the graph 100 represents the operation y=σ(W x+b).

The fully connected layer represented by FIG. 1 may be trained using floating point values, then quantized into an integer neural network. When a floating point neural network is quantized to an integer representation there are typically two operations involved: scaling and rounding. Scaling consists of multiplying parameters of the network (such as weights, biases, and the like) by a scalar. Rounding consists of replacing each scaled value by the nearest integer. At any point on the graph, a "scale factor" determines the relationship between the integer representation and the true floating-point values. For example, suppose the graph 100 of FIG. 1 is converted to an integer representation. The input $X_t$ is assumed to have been scaled by some number, such alpha_x ($\alpha_x$), and the weights are scaled by another number, call it alpha_w ($\alpha_w$). The implied scale factor of the product is the product of the scale factors $\alpha_x$ and $\alpha_w$. Without the rounding operation, the integer representation of the product Wx is $\alpha_w \alpha_x$ or $(\alpha_w \alpha_x)(Wx)$. Note that when adding two numbers in integer representation, their scale factors should be the same, due to the distributive property of addition. Thus, the integer representation of W and x determine the integer representation of the bias b. In other words, b is scaled to match Wx using the product of the scale factors, $((\alpha_w \alpha_x)b)$. Also note that activation functions are simply element-wise scalar-to-scalar mappings, such as (f: R→R). As a result, the scale factor for the output of the activation function may be selected independently of the input.

It is advantageous to choose the integer representation of a neural network in advance of using the network. Doing so means that smaller models may be deployed saving valuable memory space in embedded applications. This also avoids the computation time involved in creating the integer representation at runtime, which is beneficial for embedded applications that may not have access to floating point hardware. However, the when choosing an integer representation in advance the selection may depend on assumptions about the dynamic range of the input ($X_t$ 102, FIG. 1). This can lead to an inaccurate integer approximation of the original floating-point network and unacceptable deviations in the network outputs.

To avoid the in accuracies and unacceptable deviations in the network outputs, in embodiments, the graph may be re-quantized while avoiding modification of weight matrices. Weight matrices and convolution filters tend to be large and storing the original floating-point weights (for later re-quantization) requires significant memory. Thus, re-quantizing weights is relatively expensive computationally. According to the present techniques, re-quantizing weights is avoided. Note that bias vectors are relatively small in size when compared to weight matrices and convolution filters, resulting in the impact on memory and computation times of storing floating point biases for later re-quantization being relatively small.

Further note that the scale factor can be viewed as flowing through the graph. For multiplication nodes and convolution nodes, the output scale factor is the product of the scale factors of all the inputs. For summation nodes, the output scale factor is the same as the input scale factor. For one-to-one mappings like activation functions, the scale factor does not propagate through. The output scale factor may be chosen independently.

Figure 2:
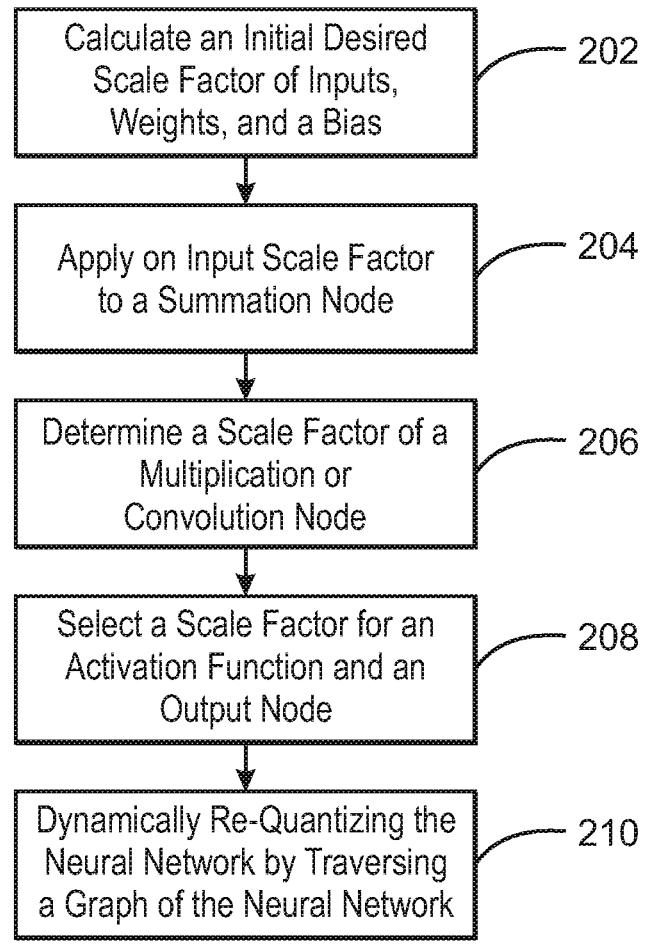
FIG. 2 is a process flow diagram of a method for graph traversal and scaling of a neural network.

FIG. 2 is a process flow diagram of a method 200 for graph traversal and scaling of a neural network. Based on the above observations, a neural network graph may be re-quantized while avoiding modification of weight matrices. In embodiments, the scale factors used previously to quantize the graph are available (e.g., stored in the vertices/nodes of the graph).

At block 202, an initial desired scale factor of network parameters is calculated. The parameters include, but are not limited to, inputs, weights, and a bias. In embodiments, the desired scale factor may be determined by scanning the current parameter values for a minimum value, maximum value, offset, and the like. The inputs may include a dynamic range of inputs. At block 204, the calculated input scale factor is applied to a summation node of the neural network. As discussed above, the output scale factor applied to the output of summation nodes is the same as the input scale factor. At block 206, a scale factor of any multiplication or convolution nodes is determined. The output scale factor applied to multiplication nodes and convolution nodes is the product of the scale factors of all the inputs. At block 208, an output scale factor of an activation function and an output node is selected. For one-to-one mappings like activation functions, the scale factor as applied to parameters of the network does not propagate through the activation function. Moreover, the scale factor of the output ($y_t$) may be selected independently. In embodiments, the scale factor of the output node is selected based on a desired range of the output.

At block 210, the scaled neural network is re-quantized as necessary based on a previous traversal of the graph. In embodiments, graph traversal is initially performed at the original quantization time. At the time the graph is traversed, a list of nodes is built that must be dynamically altered during re-quantization or inference. Then at time of inference, the portions of the graph to modify have been previously determined via the list of nodes. The graph may be traversed according to various graph traversal algorithms such as a depth-first search or breadth-first search. While traversing the graph of the neural network, a scale factor for each edge or arc of the graph is re-calculated. For example, for multiplication nodes, the output scale factor is the product of the scale factors of all the inputs. In this case, the new scale factor is propagated from the inputs forward along the output arc. Similarly, for convolution nodes, the output is scale factor is the product of the scale factors of all the inputs. Again, the new scale factor is propagated from the inputs forward along the output arc.

For summation nodes, the output scale factor is the same as the input scale factor. If the scale factor of the current incoming arc (the arc being traversed) has changed, this implies that scale factors for all other incoming arcs to the summation node must be changed to match. This is accomplished by following (traversing) the remaining incoming arcs backwards. When traversing the remaining incoming arcs backwards, if the arc's scale factor matches the new scale factor then that particular arc is no longer followed. If a terminal data node (such as the bias b 106 of FIG. 1) is reached, then the data is re-quantized using the input scale factor and the new scale factor is assigned to the outgoing arc. Further, when traversing the remaining incoming arcs backwards, if a delay node is reached, the traversal moves through the delay node since delay nodes do not alter data scaling. Finally, when a multiplication or convolution node is reached when traversing the remaining incoming arcs backwards, the scale factor on one or more of the incoming arcs to the multiplication or convolution node must be modified so that its outgoing arc scale matches the new target scale factor. If a multiplication or convolution node is not followed by an activation function and there is a conflict of scale factors, a scaling node may be inserted to resolve the conflict. For one-to-one mapping nodes like activation functions, the backwards traversal is stopped and is not traversed further.

In this manner, updated scale factors are propagated through the graph of the neural network. The values can then be rounded to the nearest integer value. The present techniques may be applied to neural networks of any size, with any number of layers. In embodiments, a neural network is re-quantized in a layer by layer fashion.

Figure 3:
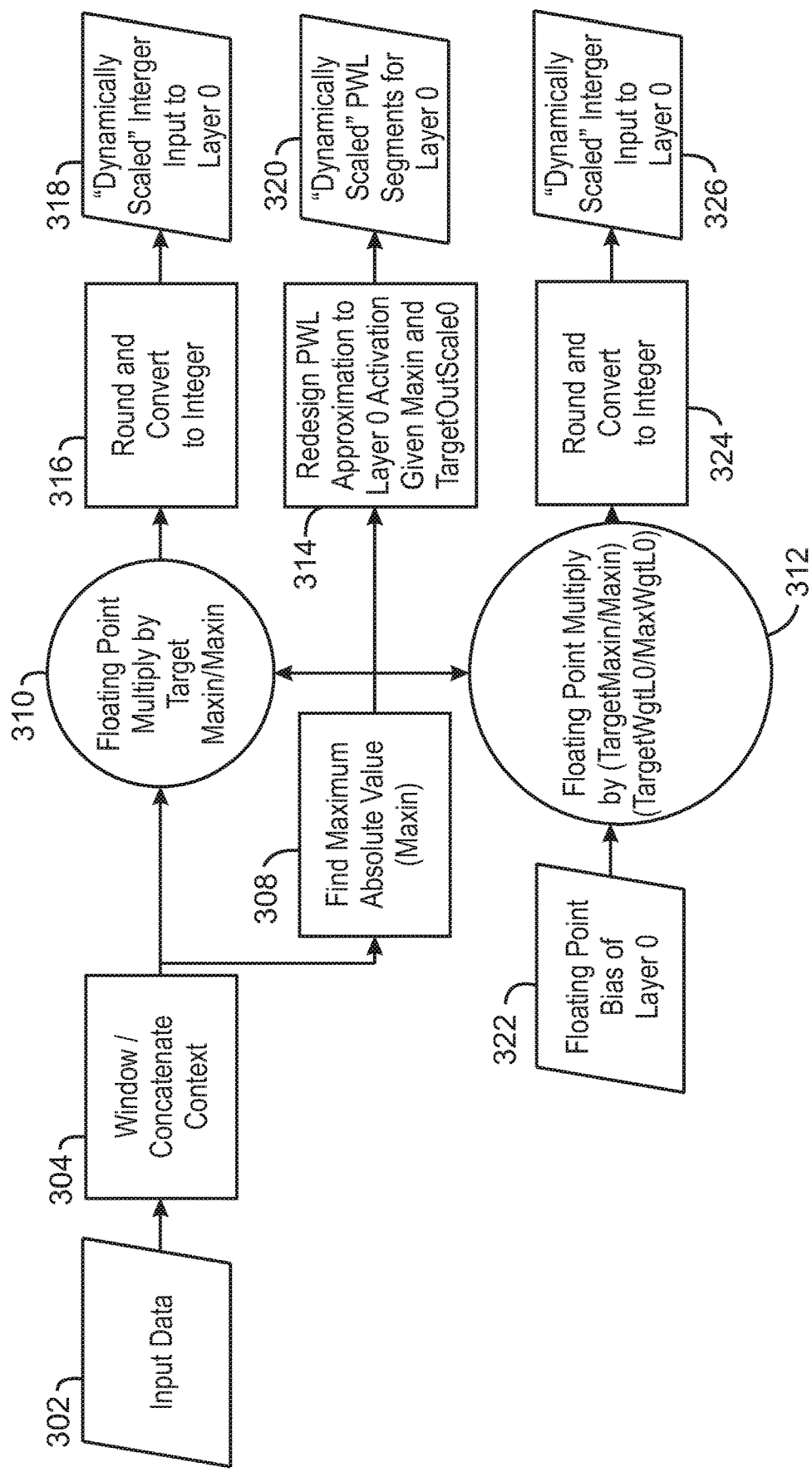
FIG. 3 is a block diagram of a method for dynamic quantization of affine neural network.

FIG. 3 is a block diagram of a method 300 for dynamic quantization of affine neural network. In the example of FIG. 3, the method 300 is derived by following the method 200 of FIG. 2 on a graph representing an affine or fully connected neural network. FIG. 3 represents a sequence of dynamic quantization operations identified via the graph traversal of FIG. 2. As illustrated in FIG. 3, the first layer affine layer is affected by the dynamic quantization, with no need to re-quantize the remaining layers. In the description of FIG. 3, the present techniques are described as applied to a first affine layer, where all nodes of the affine layer connect to all nodes of a subsequent layer. However, the present techniques can be applied to any neural network type and any layer type.

At block 302, input data is obtained. For example, the input data may be an audio frame. As used herein, an audio frame is a portion of audio signals that occur during a predefined unit, step, or slice of time. For example, the audio frame may represent audio data within a 25 millisecond (ms) slice of time. A given utterance may include a plurality of audio frames. In embodiments, a feature extraction algorithm may be applied to the audio frames. The feature extraction algorithm may derive values that represent relevant information extracted from the input data. The derived values may be referred to as feature vectors. In embodiments, the input data may consist of audio frames or feature vectors.

While particular input data may obtained as an audio frame, the dynamic range of the input data is unknown. As used herein, the dynamic range refers to a variation of values, typically between a lower limit and an upper limit. For example, the dynamic range of the audio frame may be [−0.25, 0, 0.25]. Additionally, in other examples, a larger dynamic range may be [−5, 0, 5]. As described below, a scale factor of the input data may be computed and the input data may be quantized. The dynamic range according to the present techniques is not known ahead of time, nor is the dynamic range reduced during training.

At block 304, a context is concatenated based on the input data. As used herein, a context may refer to additional frames or feature vectors before and/or after the audio frame of interest. The current context may be determined based on the context of the previous window or slice. The current context is then concatenated with previous contexts and used as an input to the neural network. In embodiments, the current context may be packed with both the previous N and the future N feature vectors, wherein each feature vector corresponds to an audio frame. For example, N may be equal to 5, and for each frame, the previous five and the future five feature vectors are used as input, along with the current feature vector. This results in a total of eleven feature vectors as input into the neural network. In this manner, a delay may be introduced into the neural network execution, where the context is delayed based on the time to obtain the future feature vectors. The present techniques may also maintain historical feature vector information.

At block 308, the maximum absolute value (MaxIn) of the concatenated feature vectors is found. By finding MaxIn, a dynamic range of the input data can be established. In embodiments, MaxIn is found from the feature vector of the current audio frame, the feature vectors of the previous N audio frames, and the feature vectors of the future N audio frames. The plurality of feature vectors is scanned to find the feature vector with the maximum absolute value (MaxIn). This maximum absolute value is passed on to multipliers at blocks 310 and 312. This maximum absolute value is also sent to a piecewise linear (PWL) approximation at block 314.

At block 310, the maximum absolute value is multiplied by a target maximum value (TargetMaxIn). The multiplication at block 310 is used to scale up the input data to avoid the loss of resolution when the data is quantized. Without scaling, only a small number of bits are available to represent the input data. The data may be scaled according to the particular hardware design of the processor that is to execute the quantized neural network. For example, a processor may contain a hardware accelerator that is thirty-six bits wide. Design parameters, such as the target maximum value (TargetMaxIn) may be selected so that they can be stored within sixteen bits. In examples, the target maximum value (TargetMaxIn) may be $2^{14}$. This value gives approximately fourteen bits of precision to represent the floating-point values. In embodiments, using the full sixteen bits of input dynamic range means that the dynamic range of the weights should be slightly reduced to provide additional headroom when the product of the input and weights are accumulated. In general, if m bits are used for inputs and n bits are used for weights, then each product is m+n bits. If the accumulator is Q bits in width, then Q-m-n bits of headroom is available for accumulation before overflow or saturation occurs. In the present example, the hardware accelerator may provide an accumulator with a maximum of thirty-six bits in width. The product of the input and weights may consume up to thirty bits, leaving six bits of headroom at the accumulator before saturation occurs.

The target maximum value (TargetMaxIn) is a value used to scale the feature vector with the maximum absolute value. The multiplication of the maximum absolute value and the target maximum value (TargetMaxIn) is done using floating point values. During a first quantization pass, initially the maximum absolute value (MaxIn) is assumed or predefined. After an initial pass, the maximum absolute value (MaxIn) will change based on the feature vectors from the now old audio frames. Thus, the quantized values are replaced by the dynamically quantized values. Biases are re-quantized based on the new maximum absolute value (MaxIn). For a fully connected affine layer, the bias vector elements are multiplied by the same scale factor.

At block 316, the scaled feature vector is rounded and converted to an integer. At block 318, the dynamically scaled integer input is provided to layer 0 (L0) of the neural network. The scaled integer input can now be used for future execution of layer 0 of the neural network. Back at block 314, the activation function of the neural network is redesigned. Recall that the scale factor of the activation function can be selected independently. The neural network is redesigned based on the maximum absolute value in (MaxIn) and the target output scale for layer 0 (TargetOutScaleL0). Typically, the activation function is a floating-point function that consumes a large amount of power. The present techniques implement an integer based activation function that is designed using a piecewise linear (PWL) approximation. In embodiments, this redesign can be performed with a particular hardware accelerator.

If floating point activation functions are used, the activation functions are scaled. In the present techniques, since an integer activation function is used with PWL approximation, the slope of the transfer function is changed to preserve a proper activation function dynamic range. Accordingly, the dynamic range of the activation function can grow or shrink by multiplying the dynamic range by a positive number, where a number greater than one grows the range, and a number less than one shrinks the range. This designs the PWL approximation for a scaled version of the activation function. In this manner, the dynamic range of the activation function can be simultaneously managed along with executing the activation function. In embodiments, the slope is modified commensurately with the scaling applied to the feature vectors and biases. At block 320, the dynamically scaled PWL segments are provided to layer 0 (L0) of the neural network and can now be used for future execution of layer 0 of the neural network.

At block 322, the floating-point bias of layer 0 is obtained, where the floating-point bias was determined during training. At block 312, the biases from layer 0 (L0) are scaled. To upscale the biases, a target maximum in (TargetMaxIn) is divided by the maximum absolute value (MaxIn) and multiplied by the target weight layer 0 (TargetWeightL0) divided by the maximum weight layer 0 (MaxWeightL0). In examples, there is a target range for the input and a target range for the weight. The target range for the output and the biases is the target range for the input multiplied by the target range for the weight. As a result, the biases are scaled up through multiplication by [TargetMaxIn/MaxIn]*[TargetWgtL0/MaxWgtL0]. The target range for the biases is TargetMaxIn*TargetWgtL0. At block 324, the scaled up floating point biases are rounded and converted to an integer form. At block 326, the dynamically scaled integer bias is provided to layer 0 (L0) of the neural network and can now be used for future execution of layer 0 of the neural network.

FIG. 3 exemplifies the dynamic quantization for a simple fully connected network. As illustrated, the optimal scale factor of the input is computed and the input is quantized. The weights of the first affine transform are left alone and the biases are re-quantized so that the network outputs conform to the original scale of the second layer input. In embodiments, if the first layer is not fully connected, a dummy diagonal affine first layer can be added. Design parameters and typical values for this dummy diagonal affine network are: TargetMaxIn ($2^{14}$), TargetWgtL0 ($2^{14}$), and TargetOutScaleL0 ($2^{11}$). Additionally, MaxWgtL0 may be calculated in advance during the Layer 0 weight quantization. These values are used to scale the weights and biases during a first quantizing pass.

Accordingly, when the floating-point network is quantized, the dynamic range is estimated. The network may be re-quantized each time a new input is received. The network may also be re-quantized each time a new input outside of the estimated dynamic range is received. The present techniques do not re-quantize the weights of the neural network. However, a record of the scale factors used in an initial quantization of the weights is stored within the network. Biases from the first layer are re-quantized. Moreover, the floating-point biases are stored, and are used to describe how the weight/biases are initially quantized. Moreover, the current bias quantizations are updated based on new quantizations.

According to the present techniques, quantization is done dynamically, on the fly. Since it is expensive performance and computation-wise to re-quantize an entire network, thus the present techniques re-quantize a portion of the floating-point network to calculate the same integer network that would be used if the entire floating-point network was re-quantized. In embodiments, on an initial pass inputs are scaled by alpha_x ($\alpha_x$) and quantized, weights are scaled by alpha_w ($\alpha_w$) and quantized, and the bias must be scaled by alpha_x ($\alpha_x$)*alpha_w ($\alpha_w$) as discussed with regard to FIG. 1. If the input needs to be rescaled, changes to the weights are avoided and then the output/bias scale is changed to compensate for the lack of change to the weights.

In embodiments, the present techniques may execute neural networks using a low power neural co-processor. The co-processor may enable continuous interference at a cloud server. The processor may be operational while an application processor is in a low power sleep state. In embodiments, the co-processor interfaces to system or private memory while avoiding CPU cache pollution.

The present techniques have been described thus far applied to a fully connected, affine, neural network. However, the same process flow can be applied to other neural networks, such as a long short-term network (LSTM). In a long short-term network, various values are stored in an LSTM layer. The methods 200 and 300 can be used to quantize an LSTM neural network, even with the recurrence present in LSTMs. An LSTM layer may store an output and generate an output for a next audio frame. The LSTM network is an example of a network with complex scaling dependencies. More parts of an LSTM graph must be dynamically quantized but the quantization according to the present techniques is done without re-quantizing any of the large data structures like weight matrices.

An exemplary LSTM layer can be represented by the following equations:

$$i_t = \sigma(W_{ix}x_t + W_{ir}r_{t-1} + W_{ic}c_{t-1} + b_i) \quad \text{Eqn. 1}$$

$$f_t = \sigma(W_{fx}x_t + W_{rf}r_{t-1} + W_{cf}c_{t-1} + b_f) \quad \text{Eqn. 2}$$

$$c_t = f_t \odot c_{t-1} + i_t \odot g(W_{cx}x_t + W_{cr}r_{t-1} + b_c) \quad \text{Eqn. 3}$$

$$o_t = \sigma(W_{ox}x_t + W_{or}r_{t-1} + W_{oc}c_t + b_o) \quad \text{Eqn. 4}$$

$$m_t = o_t \odot h(c_t) \quad \text{Eqn. 5}$$

$$r_t = W_{rm}m_t \quad \text{Eqn. 6}$$

In the above equations, $i_t$ is the input gate activation at the current audio frame, $f_t$ is the forget gate activation at the current audio frame, $c_t$ is the cell activation at the current audio frame, $o_t$ is the output gate activation at the current audio frame, $c_{t-1}$ is the cell activation at the previous audio frame, $\odot$ is an element-wise product operation, g is the cell input activation function, h is the cell output activation function, each W term is a respective matrix of current weight values for the LSTM memory cell, and $b_i$, $b_f$, $b_c$, and $b_o$ are bias vectors. Moreover, $m_t$ is an output that is computed based on the output gate activation, the cell output activation, and the cell activation at the current audio frame as indicated by Eqn. 5. A recurrent projection layer may compute a recurrent projected output $r_t$ for the current audio frame using the output $m_t$ as indicated by Eqn. 6. In particular, the recurrent projected output $r_t$ is calculated via a matrix of current values of weights for the recurrent projection layer $W_{rm}$. The recurrent projected output $r_t$ can then be provided to an output layer for use in computing a phoneme representation or to a next layer in the network. In the event that the next layer is an LSTM layer, the output may be fed back to a memory cell for use in computing the output $m_{t+1}$ at the next audio frame in the plurality of audio frames.

In embodiments, LSTM memory blocks may process the input received from a previous layer to collectively generate an LSTM output for the audio frame. In an LSTM memory cell, an input gate controls the flow of input activations into the memory cell and an output gate controls the output $m_t$ flow of the cell. Moreover, a forget gate scales the internal state of the cell before adding it as input to the cell through the cell states. Once the output $m_t$ has been computed, a recurrent projection layer computes a recurrent projected output $r_t$ for the current audio frame using the output $m_t$.

In some cases, the neural co-processor may not include memory blocks as used by an LSTM layer. Accordingly, the present techniques use primitive layer operations (affine and diagonal affine operations with optional activation function) to realize an LSTM as described by Eqns. 1-6. In embodiments, primitive layer operations may be used to quantize an LSTM layer. Traditionally, the approach to parameter and data quantization in digital signal processing (DSP) systems is to study the behavior of a floating-point reference implementation, creating histograms of the data and parameters over a significant number of expected inputs. Then, a fixed-point scheme would be designed where data and parameters are assigned decimal (m) and fractional (n) bit lengths to define fractional representations (Qm.n). Instead, the present techniques use a different approach to reduce the dependency on the input data statistics.

Figure 4:
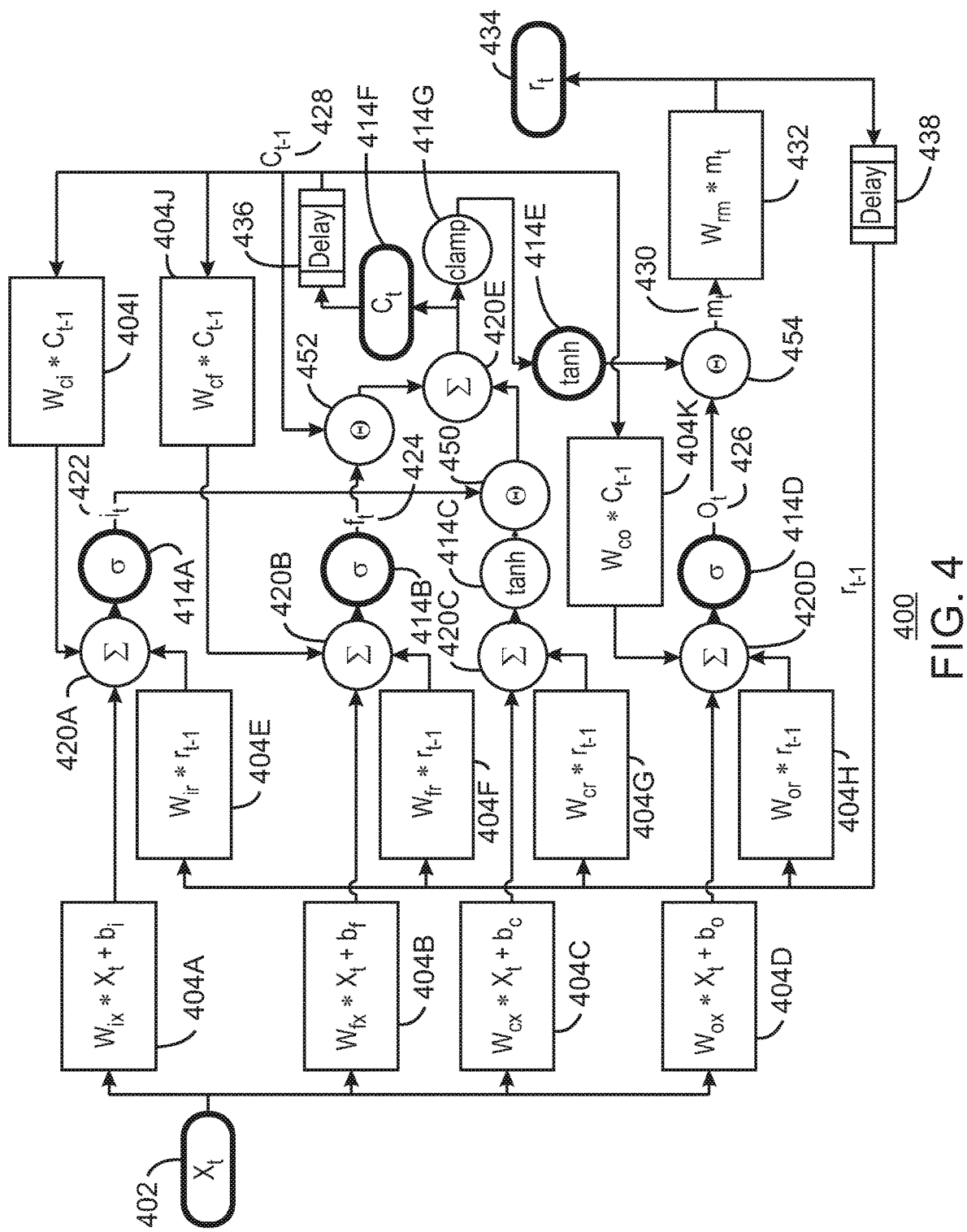
FIG. 4 is a block diagram showing a medium that contains logic for dynamic quantization of a neural network.

FIG. 4 is a block diagram 400 showing a medium that contains logic for dynamic quantization of a neural network. The block diagram 400 includes an input 402, various weighted primitive operations 404A, 404B, 404C, 404D, 404E, 404F, 404G, 404H, 404I, 404J, and 404K, activation functions 414A, 414B, 414C, 414D, and 414E. Each of the weighted operations may represent eleven primitive functions to realize an LSTM as described above. The weighted operations 404A, 404B, 404C, 404D, 404E, 404F, 404G, 404H, 404I, 404J, and 404K are summed via summation nodes 420A, 420B, 420C, and 402D as illustrated. The output of the summation nodes 420A, 420B, 420C, and 402D are input to activation functions 414A, 414B, 414C, and 414D as illustrated.

The weighted operations result in an input gate activation 422 input to an element wise product operation 450. A forget gate 424 is input to an element wise product operation 452. A summation 420E is input to a cell activation function at 414F. Clamping is applied at block 414G. The output $m_t$ 430 is computed, then a recurrent projection layer computes a recurrent projected output $r_t$ 434 via operation 432 for the current audio frame using the output $m_t$ 430. Delays 436 and 438 are introduced to the network to obtain a state or past value of the network for further processing. Delay elements are inserted to create persistence, so that the value from the previous invocation is available for the current invocation.

Accordingly, when the procedure method 200 of FIG. 2 is applied to an LSTM network implemented via primitive layers described above, the following operations are identified. At block 402, a maximum of an input buffer is found, and the input contained in the input buffer is quantized at runtime as described with respect to FIG. 3. The dependent scale factors of the input transform may be updated. Accordingly, at blocks 404A, 404B, 404C, 404D, 404E, 404F, 404G, 404H, 404I, 404J, and 404K a scale factor may be determined as described with respect to block 202, FIG. 2. Additionally, scale factors of the forget gate activation at block 414B, cell output activation at blocks 414G and 414E, and projection output at block 432 may be determined. Note that FIG. 4 illustrates an LSTM prior to quantization. After quantization, a scaling node may be inserted at the projection output, since the projection output has no activation. Thus, the scaling node enables scaling of an output without an activation. In the primitive layer implementation of the LTSM, scaling at the projection node already exists so no new node is required.

The floating point biases of the input transform (404A, 404B, 404C, 404D) may be re-quantized using the new input scale factor and original weight scale factor according to bias quantization described at blocks 322, 312, and 324 of FIG. 3. Additionally, the input gate (414A), forget gate (414B), cell input (414C), cell output (414E), output gate (414D), and (newly inserted) projection (at output of 432) activation function may be re-quantized and given updated scale factors. Further, the LSTM layer state (434) and cell state (414F) may be re-quantized given the updated scale factors.

Figure 5:
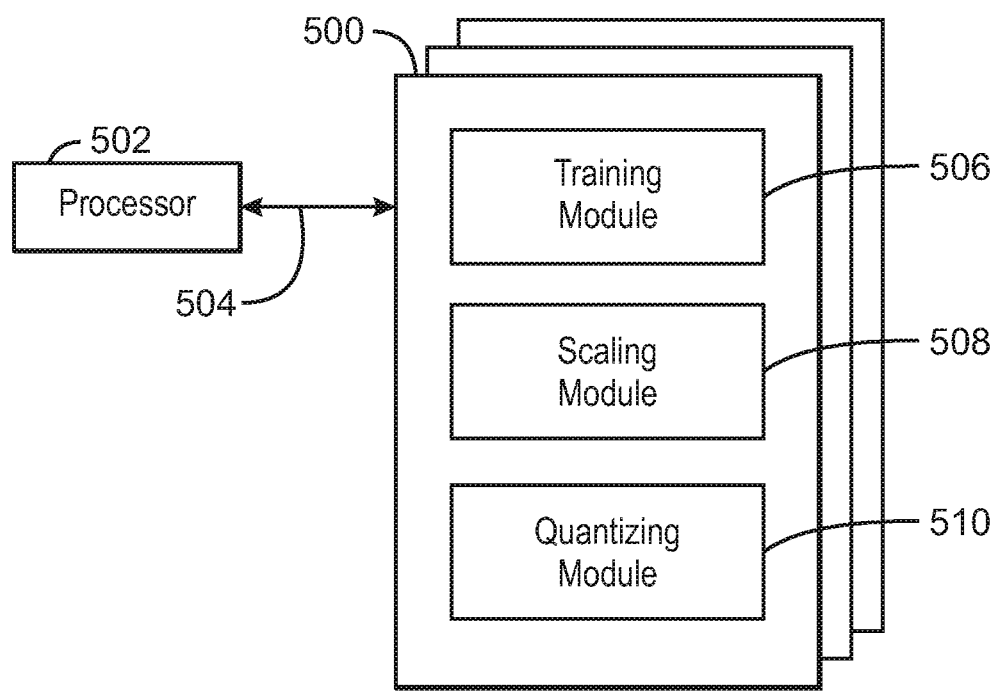
FIG. 5 is a block diagram showing a medium that contains logic for dynamic quantization of a neural network.

FIG. 5 is a block diagram showing a medium 500 that contains logic for dynamic quantization of a neural network. The medium 500 may be a computer-readable medium, including a non-transitory medium that stores code that can be accessed by a processor 502 over a computer bus 504. For example, the computer-readable medium 500 can be volatile or non-volatile data storage device. The medium 500 can also be a logic unit, such as an Application Specific Integrated Circuit (ASIC), a Field Programmable Gate Array (FPGA), or an arrangement of logic gates implemented in one or more integrated circuits, for example.

The medium 500 may include modules 506-510 configured to perform the techniques described herein. For example, a training module 506 may be configured to train a neural network. In embodiments, a neural network may be trained using floating point values. A scaling module 508 may be configured to scale the inputs, weights, and biases of the floating point neural network. In embodiments, the scaling module may dynamically calculate new scaling factors for inputs, biases, activation functions for re-quantizing a neural network. A quantizing module 510 may be configured to quantize the scaled values. In some embodiments, the modules 506-510 may be modules of computer code configured to direct the operations of the processor 502.

The block diagram of FIG. 5 is not intended to indicate that the medium 500 is to include all of the components shown in FIG. 5. Further, the medium 500 may include any number of additional components not shown in FIG. 5, depending on the details of the specific implementation.

Figure 6:
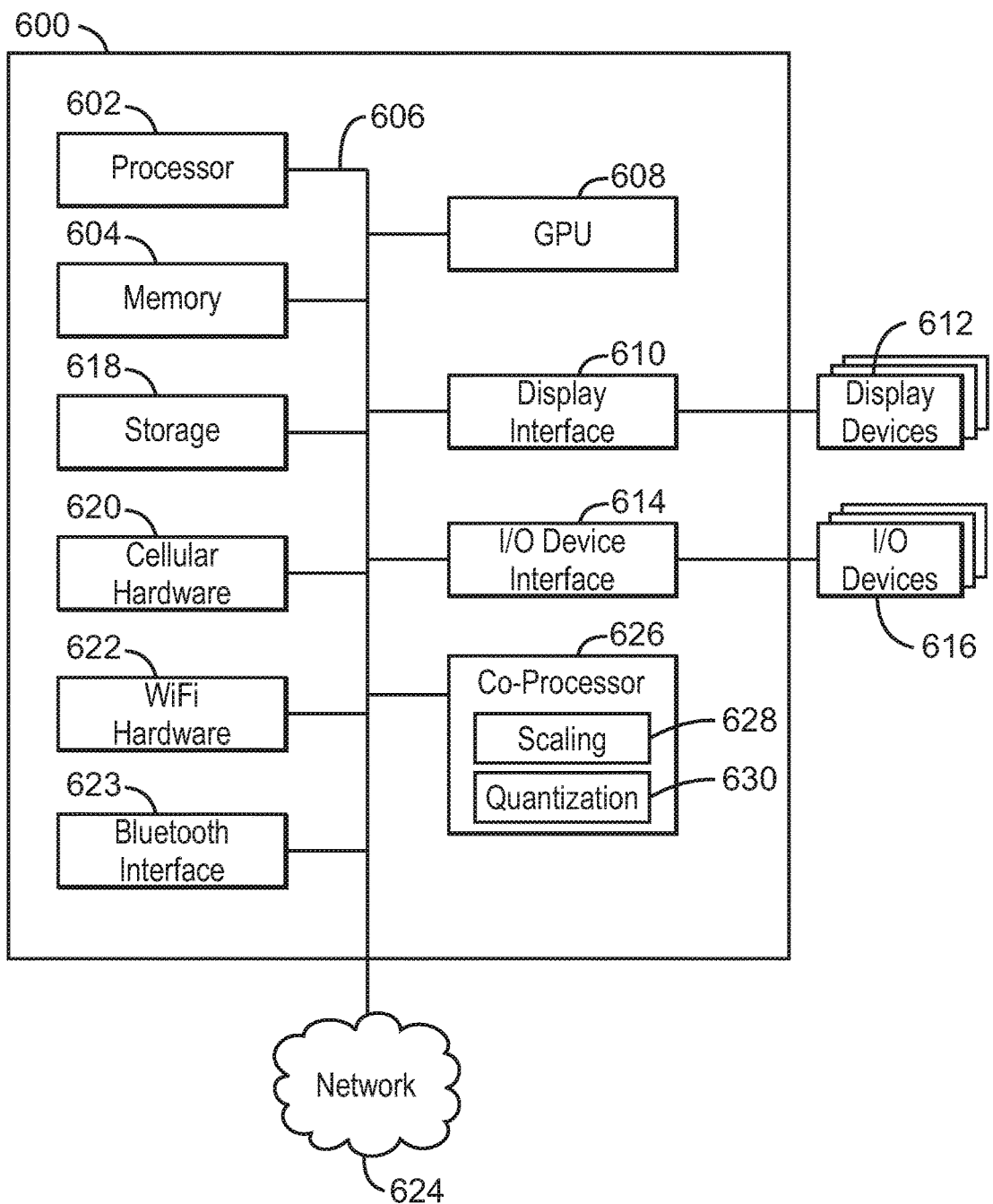
FIG. 6 is a block diagram of an electronic device for dynamic quantization of neural networks.

FIG. 6 is a block diagram of an electronic device for dynamic quantization of neural networks. The electronic device 600 may be, for example, a laptop computer, tablet computer, mobile phone, smart phone, or a wearable device, among others. The electronic device 600 may include a central processing unit (CPU) 602 that is configured to execute stored instructions, as well as a memory device 604 that stores instructions that are executable by the CPU 602. The CPU may be coupled to the memory device 604 by a bus 606. Additionally, the CPU 602 can be a single core processor, a multi-core processor, a computing cluster, or any number of other configurations. Furthermore, the electronic device 600 may include more than one CPU 602. The memory device 604 can include random access memory (RAM), read only memory (ROM), flash memory, or any other suitable memory systems. For example, the memory device 604 may include dynamic random-access memory (DRAM).

The electronic device 600 also includes a graphics processing unit (GPU) 608. As shown, the CPU 602 can be coupled through the bus 606 to the GPU 608. The GPU 608 can be configured to perform any number of graphics operations within the electronic device 600. For example, the GPU 608 can be configured to render or manipulate graphics images, graphics frames, videos, or the like, to be displayed to a user of the electronic device 600. In some embodiments, the GPU 608 includes a number of graphics engines, wherein each graphics engine is configured to perform specific graphics tasks, or to execute specific types of workloads.

The CPU 602 can be linked through the bus 606 to a display interface 610 configured to connect the electronic device 600 to a display device 612. The display device 612 can include a display screen that is a built-in component of the electronic device 600. The display device 612 can also include a computer monitor, television, or projector, among others, that is externally connected to the electronic device 600.

The CPU 602 can also be connected through the bus 606 to an input/output (I/O) device interface 614 configured to connect the electronic device 600 to one or more I/O devices 616. The I/O devices 616 can include, for example, a keyboard and a pointing device, wherein the pointing device can include a touchpad or a touchscreen, among others. The I/O devices 616 can be built-in components of the electronic device 600, or can be devices that are externally connected to the electronic device 600.

The electronic device may also include a storage device 618. The storage device 618 is a physical memory such as a hard drive, an optical drive, a flash drive, an array of drives, or any combinations thereof. The storage device 618 can store user data, such as audio files, video files, audio/video files, and picture files, among others. The storage device 618 can also store programming code such as device drivers, software applications, operating systems, and the like. The programming code stored to the storage device 618 may be executed by the CPU 602, GPU 608, or any other processors that may be included in the electronic device 600.

The CPU 602 may be linked through the bus 606 to cellular hardware 620. The cellular hardware 620 may be any cellular technology, for example, the 4G standard (International Mobile Telecommunications-Advanced (IMT-Advanced) Standard promulgated by the International Telecommunications Union—Radio communication Sector (ITU-R)). In this manner, the electronic device 600 may access any network 624 without being tethered or paired to another device, where the network 624 is a cellular network.

The CPU 602 may also be linked through the bus 606 to WiFi hardware 622. The WiFi hardware is hardware according to WiFi standards (standards promulgated as Institute of Electrical and Electronics Engineers' (IEEE) 802.11 standards). The WiFi hardware 622 enables the electronic device 600 to connect to the Internet using the Transmission Control Protocol and the Internet Protocol (TCP/IP), where the network 624 is the Internet. Accordingly, the electronic device 600 can enable end-to-end connectivity with the Internet by addressing, routing, transmitting, and receiving data according to the TCP/IP protocol without the use of another device. Additionally, a Bluetooth Interface 623 may be coupled to the CPU 602 through the bus 606. The Bluetooth Interface 623 is an interface according to Bluetooth networks (based on the Bluetooth standard promulgated by the Bluetooth Special Interest Group). The Bluetooth Interface 623 enables the electronic device 600 to be paired with other Bluetooth enabled devices through a personal area network (PAN). Accordingly, the network 624 may be a PAN. Examples of Bluetooth enabled devices include a laptop computer, desktop computer, ultrabook, tablet computer, mobile device, or server, among others. While one network is illustrated, the electronic device 600 can connect with a plurality of networks simultaneously.

FIG. 6 also includes a co-processor 626. The co-processor 626 may be used to execute automatic speech recognition workloads. In some cases, automatic speech recognition is realized by executing a neural network. The neural network may be trained using floating point values. The neural network may be converted to an integer network by scaling 628 various values of the network, then rounding and/or quantizing 630 the scaled-up values.

The block diagram of FIG. 6 is not intended to indicate that the electronic device 600 is to include all of the components shown in FIG. 6. Rather, the computing system 600 can include fewer or additional components not illustrated in FIG. 6 (e.g., sensors, power management integrated circuits, additional network interfaces, etc.). The electronic device 600 may include any number of additional components not shown in FIG. 6, depending on the details of the specific implementation. Furthermore, any of the functionalities of the CPU 602 may be partially, or entirely, implemented in hardware and/or in a processor. For example, the functionality may be implemented with an application specific integrated circuit, in logic implemented in a processor, in logic implemented in a specialized graphics processing unit, or in any other device.

Example 1 is an apparatus. The apparatus includes a scaling unit to calculate an initial scale factor of an input and parameters of a floating point neural network; a rounding unit to apply the initial scale factor to the input and parameters to obtain a plurality of scaled values, and to round the plurality of scaled values to integer form to quantize the floating point neural network to an integer neural network; a graph traverser to traverse a graph of the integer neural network to derive a scale factor for each arc of the graph, and to: update a scale factor of the outgoing arc of a summation node to be an input scale factor of an incoming arc of a plurality of incoming arcs of the summation node; update a scale factor of the outgoing arc of a multiplication node that is a product of all input scale factors along an incoming arc of the multiplication node; update a scale factor of the outgoing arc of a convolution node that is a product of all input scale factors along an incoming arc of the convolution node; re-quantize a terminal data node along the plurality of incoming arcs of the summation node to match an upstream scale factor; and stop the traversal of a current arc in response to a mapping node along the plurality of incoming arcs of the summation node.

Example 2 includes the apparatus of example 1, including or excluding optional features. In this example, in response to a scale factor of the incoming arc to the summation node changing, traversing the remaining incoming arcs of the plurality of incoming arcs to the summation node backwards.

Example 3 includes the apparatus of any one of examples 1 to 2, including or excluding optional features. In this example, the graph traverser is to update the scale factor of the multiplication node by propagating the scale factor forward along an output arc.

Example 4 includes the apparatus of any one of examples 1 to 3, including or excluding optional features. In this example, the graph traverser is to update the scale factor of the convolution node by propagating the scale factor forward along an output arc.

Example 5 includes the apparatus of any one of examples 1 to 4, including or excluding optional features. In this example, in response to a delay node along an arc of the plurality of arcs of the summation node, a scale factor is propagated through the delay node.

Example 6 includes the apparatus of any one of examples 1 to 5, including or excluding optional features. In this example, the mapping node is an activation function node and the scale factor for output arc of the activation node is selected independently of other scale factors.

Example 7 includes the apparatus of any one of examples 1 to 6, including or excluding optional features. In this example, re-quantizing of a weight is avoided.

Example 8 includes the apparatus of any one of examples 1 to 7, including or excluding optional features. In this example, scale factors used to initially quantize the floating point neural network are stored at a respective node or arc of the graph.]

Example 9 includes the apparatus of any one of examples 1 to 8, including or excluding optional features. In this example, the initial scale factor of the input is calculated by scanning the inputs for a current minimum value, maximum value, and offset value, and determining a dynamic range of the input.

Example 10 includes the apparatus of any one of examples 1 to 9, including or excluding optional features. In this example, a scale factor is recalculated for each arc to re-quantize the integer neural network.

Example 11 is an apparatus. The apparatus includes a scaling unit to calculate a scale factor of an input, a weight and a bias of a floating point neural network; a graph traverser to traverse a graph of the floating point neural network, and to: apply a scale factor to a summation node that is the input scale factor of an incoming arc of the summation node; apply a scale factor to a multiplication node that is a product of all input scale factors along an incoming arc of the multiplication node; apply a scale factor of a convolution node that is a product of all input scale factors along an incoming arc of the convolution node; a rounding unit to round a plurality of scaled values to integer form to quantize the floating point neural network.

Example 12 includes the apparatus of example 11, including or excluding optional features. In this example, in response to a change in a scale factor of an incoming arc of the summation node, any remaining incoming arcs to the summation node are traversed backwards to derive a new scale factor of the summation node. Optionally, in response to a terminal data node along a remaining incoming arc to the summation node, the output scale factor of the summation node is a product of all scale factors of inputs. Optionally, in response to a multiplication or convolution node along a remaining incoming arc to the summation node, a scale factor of one or more incoming arcs to the multiplication or convolution node is modified such that its outgoing arc scale factor matches a target scale factor. Optionally, in response to a conflict of scale factors when a multiplication or convolution node along a remaining incoming arc to the summation node is not followed by an activation function, a scaling node is inserted along the remaining incoming arc to resolve the conflict of scale factors.

Example 13 includes the apparatus of any one of examples 11 to 12, including or excluding optional features. In this example, an input scale factor is estimated based on a current context of the inputs.

Example 14 includes the apparatus of any one of examples 11 to 13, including or excluding optional features. In this example, a bias scale factor is scaled to match the weight scale factor and the input scale factor by multiplying the weight scale factor by the input scale factor.

Example 15 includes the apparatus of any one of examples 11 to 14, including or excluding optional features. In this example, the quantized floating point neural network is executed on a low power co-processor.

Example 16 includes the apparatus of any one of examples 11 to 15, including or excluding optional features. In this example, the floating point neural network is an LSTM modeled as a plurality of primitive layer types, and a plurality of scale factors of one layer is dependent on a plurality of scale factors from a previous layer.

Example 17 includes the apparatus of any one of examples 11 to 16, including or excluding optional features. In this example, the floating point neural network is an LSTM modeled as a plurality of primitive layer types and an input quantization is determined by an output quantization of a preceding layer.

Example 18 is a method. The method includes calculating an initial scale factor of an input and parameters of a floating point neural network; applying the initial scale factor to the input and parameters to obtain a plurality of scaled values, and to round the plurality of scaled values to integer form to quantize the floating point neural network to an integer neural network; deriving a scale factor for each arc of a graph of the integer neural network by traversing the graph, and: updating a scale factor of the outgoing arc of a summation node to be an input scale factor of an incoming arc of a plurality of incoming arcs of the summation node; updating a scale factor of the outgoing arc of a multiplication node that is a product of all input scale factors along an incoming arc of the multiplication node; updating a scale factor of the outgoing arc of a convolution node that is a product of all input scale factors along an incoming arc of the convolution node; re-quantizing a terminal data node along the plurality of incoming arcs of the summation node to match an upstream scale factor; and stopping the traversal of a current arc in response to a mapping node along the plurality of incoming arcs of the summation node.

Example 19 includes the method of example 18, including or excluding optional features. In this example, in response to a scale factor of the incoming arc to the summation node changing, traversing the remaining incoming arcs of the plurality of incoming arcs to the summation node backwards.

Example 20 includes the method of any one of examples 18 to 19, including or excluding optional features. In this example, the method includes updating the scale factor of the multiplication node by propagating the scale factor forward along an output arc.

Example 21 includes the method of any one of examples 18 to 20, including or excluding optional features. In this example, the method includes updating the scale factor of the convolution node by propagating the scale factor forward along an output arc.

Example 22 includes the method of any one of examples 18 to 21, including or excluding optional features. In this example, in response to a delay node along an arc of the plurality of arcs of the summation node, a scale factor is propagated through the delay node.

Example 23 includes the method of any one of examples 18 to 22, including or excluding optional features. In this example, the mapping node is an activation function node and the scale factor for output arc of the activation node is selected independently of other scale factors.

Example 24 includes the method of any one of examples 18 to 23, including or excluding optional features. In this example, re-quantizing of a weight is avoided.

Example 25 includes the method of any one of examples 18 to 24, including or excluding optional features. In this example, scale factors used to initially quantize the floating point neural network are stored at a respective node or arc of the graph.

Example 26 includes the method of any one of examples 18 to 25, including or excluding optional features. In this example, the initial scale factor of the input is calculated by scanning the inputs for a current minimum value, maximum value, and offset value, and determining a dynamic range of the input.

Example 27 includes the method of any one of examples 18 to 26, including or excluding optional features. In this example, a scale factor is recalculated for each arc to re-quantize the integer neural network.

Example 28 is a system. The system includes a memory that is to store instructions; and a processor communicatively coupled to the memory, wherein when the processor is to execute the instructions, the processor is to: train a floating point neural network; calculate an input scale factor of the input based on an estimated dynamic range of the input; calculate a bias scale factor, a plurality of node scale factors, and an activation function scale factor; apply the input scale factor, bias scale factor, plurality of node scale factors, and activation function scale factor to the floating point neural network to upscale values of the floating point neural network; and round the upscaled values to quantize the floating point neural network.

Example 29 includes the system of example 28, including or excluding optional features. In this example, the upscaled values comprise: the input multiplied by the input scale factor; a bias multiplied by the bias scale factor; a multiplication node multiplied by the input scale factor; a summation node multiplied by the input scale factor; an activation function multiplied by the activation function scale factor; and an output node multiplied by an output node scale factor.

Example 30 includes the system of any one of examples 28 to 29, including or excluding optional features. In this example, an output node scale factor is a product of all input scale factors.

Example 31 includes the system of any one of examples 28 to 30, including or excluding optional features. In this example, the input scale factor is estimated based on a current context of a plurality of inputs.

Example 32 includes the system of any one of examples 28 to 31, including or excluding optional features. In this example, the initial bias scale factor is determined by based on a dynamic range of bias values.

Example 33 includes the system of any one of examples 28 to 32, including or excluding optional features. In this example, an output scale factor is determined based on a desired range of an output of the network.

Example 34 includes the system of any one of examples 28 to 33, including or excluding optional features. In this example, the system includes inserting a scaling node in the neural network in response to a conflict of scale factors.

Example 35 includes the system of any one of examples 28 to 34, including or excluding optional features. In this example, the quantized floating point neural network is executed on a low power co-processor.

Example 36 includes the system of any one of examples 28 to 35, including or excluding optional features. In this example, the neural network is an LSTM modeled as a plurality of primitive layer types and an input quantization is determined by an output quantization of a preceding layer.

Example 37 includes the system of any one of examples 28 to 36, including or excluding optional features. In this example, the neural network is re-quantized on a frame by frame basis.

Example 38 is at least one non-transitory machine-readable medium having instructions stored therein that. The computer-readable medium includes instructions that direct the processor to train a floating point neural network; calculate an input scale factor of the input based on an estimated dynamic range of the input; calculate a bias scale factor, a plurality of node scale factors, and an activation function scale factor; apply the input scale factor, bias scale factor, plurality of node scale factors, and activation function scale factor to the floating point neural network to upscale values of the floating point neural network; and round the upscaled values to quantize the floating point neural network.

Example 39 includes the computer-readable medium of example 38, including or excluding optional features. In this example, the upscaled values comprise: the input multiplied by the input scale factor; a bias multiplied by the bias scale factor; a multiplication node multiplied by the input scale factor; a summation node multiplied by the input scale factor; an activation function multiplied by the activation function scale factor; and an output node multiplied by an output node scale factor.

Example 40 includes the computer-readable medium of any one of examples 38 to 39, including or excluding optional features. In this example, an output node scale factor is a product of all input scale factors.

Example 41 includes the computer-readable medium of any one of examples 38 to 40, including or excluding optional features. In this example, the input scale factor is estimated based on a current context of a plurality of inputs.

Example 42 includes the computer-readable medium of any one of examples 38 to 41, including or excluding optional features. In this example, the initial bias scale factor is determined by based on a dynamic range of bias values.

Example 43 includes the computer-readable medium of any one of examples 38 to 42, including or excluding optional features. In this example, an output scale factor is determined based on a desired range of an output of the network.

Example 44 includes the computer-readable medium of any one of examples 38 to 43, including or excluding optional features. In this example, the computer-readable medium includes inserting a scaling node in the neural network in response to a conflict of scale factors.

Example 45 includes the computer-readable medium of any one of examples 38 to 44, including or excluding optional features. In this example, the quantized floating point neural network is executed on a low power co-processor.

Example 46 includes the computer-readable medium of any one of examples 38 to 45, including or excluding optional features. In this example, the neural network is an LSTM modeled as a plurality of primitive layer types and an input quantization is determined by an output quantization of a preceding layer.

Example 47 includes the computer-readable medium of any one of examples 38 to 46, including or excluding optional features. In this example, the neural network is re-quantized on a frame by frame basis.

Example 48 is an apparatus. The apparatus includes instructions that direct the processor to a means to: calculate an initial scale factor of an input, a weight and a bias of a floating point neural network; apply an initial input scale factor to a summation node of the floating point neural network; determine a scale factor for a multiplication node of the floating point neural network based on the initial input scale factor; and select a scale factor for an activation function and an output node of the floating point neural network; a rounding unit to round a plurality of scaled values to integer form to quantize the floating point neural network.

Example 49 includes the apparatus of example 48, including or excluding optional features. In this example, the plurality of scaled values comprises: the input multiplied by the initial input scale factor; the weight multiplied by an initial weight scale factor; a bias multiplied by an initial bias scale factor; a multiplication node multiplied by the initial input scale factor; a summation node multiplied by the initial input scale factor; an activation function multiplied by an initial activation function scale factor; and an output node multiplied by an initial output node scale factor.

Example 50 includes the apparatus of any one of examples 48 to 49, including or excluding optional features. In this example, the apparatus includes re-quantizing the floating point neural network by scaling parameter comprising the input, bias, multiplication node, summation node, activation function, and output node, and then rounding the scaled parameters.

Example 51 includes the apparatus of any one of examples 48 to 50, including or excluding optional features. In this example, an initial input scale factor is estimated based on a current context of the inputs.

Example 52 includes the apparatus of any one of examples 48 to 51, including or excluding optional features. In this example, an initial bias scale factor is scaled to match an initial weight scale factor and an initial input scale factor by multiplying the initial weight scale factor by the initial input scale factor.

Example 53 includes the apparatus of any one of examples 48 to 52, including or excluding optional features. In this example, the floating point neural network is an affine neural network, and an initial scale factor of the multiplication nodes is the product of the scale factors of all inputs across a time period.

Example 54 includes the apparatus of any one of examples 48 to 53, including or excluding optional features. In this example, the quantized floating point neural network is executed on a low power co-processor.

Example 55 includes the apparatus of any one of examples 48 to 54, including or excluding optional features. In this example, the floating point neural network is an LSTM modeled as a plurality of primitive layer types, and a plurality of scale factors of one layer is dependent on a plurality of scale factors from a previous layer.

Example 56 includes the apparatus of any one of examples 48 to 55, including or excluding optional features. In this example, the floating point neural network is an LSTM modeled as a plurality of primitive layer types and an input quantization is determined by an output quantization of a preceding layer.

Example 57 includes the apparatus of any one of examples 48 to 56, including or excluding optional features. In this example, the floating point neural network is re-quantized on a frame by frame basis.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus, comprising:
scaling circuitry to calculate an initial scale factor of an input and parameters of a floating point neural network;
rounding circuitry to apply the initial scale factor to the input and the parameters to obtain a plurality of scaled values, and to round the plurality of scaled values to integer form to quantize the floating point neural network;
graph traverser circuitry to traverse a graph of integer neural network circuitry to derive second scale factors for corresponding arcs of the graph, and to:
  update a third scale factor of a first outgoing arc of a summation node to be a first input scale factor of a first incoming arc of a plurality of incoming arcs of the summation node;
  update a fourth scale factor of a second outgoing arc of a multiplication node that is a product of second input scale factors along a second incoming arc of the multiplication node;
  update a fifth scale factor of a third outgoing arc of a convolution node that is a product of third input scale factors along a third incoming arc of the convolution node;
  re-quantize a terminal data node along the plurality of incoming arcs of the summation node to match an upstream scale factor; and
  stop a traversal of a current arc after detection of a mapping node along the plurality of incoming arcs of the summation node; and
the integer neural network circuitry to process an input signal from a sensor based on at least one of the third scale factor, the fourth scale factor, or the fifth scale factor.

2. The apparatus of claim 1, wherein after a change of a sixth scale factor of the first incoming arc to the summation node, the graph traverser circuitry is to traverse remaining incoming arcs of the plurality of incoming arcs to the summation node backwards.

3. The apparatus of claim 1, wherein the graph traverser circuitry is to update the fourth scale factor of the multiplication node by propagating the fourth scale factor forward along an output arc.

4. The apparatus of claim 1, wherein the graph traverser circuitry is to update the fifth scale factor of the convolution node by propagating the fifth scale factor forward along an output arc.

5. The apparatus of claim 1, wherein after detection of a delay node along an arc of the plurality of incoming arcs of the summation node, the graph traverser circuitry is to propagate a sixth scale factor through the delay node.

6. The apparatus of claim 1, wherein the mapping node is an activation function node and the graph traverser circuitry is to select a sixth scale factor for an output arc of the activation function node independently of other scale factors.

7. The apparatus of claim 1, wherein re-quantizing of a weight is avoided.

8. The apparatus of claim 1, wherein sixth scale factors used to initially quantize the floating point neural network are stored at a respective node or arc of the graph.

9. The apparatus of claim 1, wherein the scaling circuitry is to:
determine the initial scale factor of the input by scanning inputs for a current minimum value, maximum value, and offset value; and
determine a dynamic range of the input.

10. The apparatus of claim 1, wherein the scaling circuitry is to recalculate sixth scale factors for the corresponding arcs to re-quantize the integer neural network circuitry.

11. A system comprising:
memory;
programmable circuitry; and
instructions to cause the programmable circuitry to:
calculate a first scale factor of an input of a floating point neural network;
apply the first scale factor to the input to obtain a plurality of scaled values;
round the plurality of scaled values to integer form to quantize the floating point neural network;
traverse a graph of integer neural network circuitry to derive second scale factors for corresponding arcs of the graph;
apply a third scale factor to a summation node, the third scale factor being a first input scale factor of a first incoming arc of the summation node;
apply a fourth scale factor to a multiplication node, the fourth scale factor being a product of second input scale factors along a second incoming arc of the multiplication node;
apply a fifth scale factor of a convolution node, the fifth scale factor being a product of third input scale factors along a third incoming arc of the convolution node; and
process an input signal from a sensor based on at least one of the third scale factor, the fourth scale factor, or the fifth scale factor.

12. The system of claim 11, wherein after a change in the first input scale factor of the first incoming arc of the summation node, the programmable circuitry is to backwards traverse remaining incoming arcs to the summation node to derive a new input scale factor of the summation node.

13. The system of claim 11, wherein the programmable circuitry is to estimate the first scale factor based on a current context of inputs.

14. The system of claim 11, wherein the programmable circuitry is to scale a bias scale factor to match a weight scale factor and a fourth input scale factor by multiplying the weight scale factor by the fourth input scale factor.

15. The system of claim 11, wherein the programmable circuitry is to process the input signal while in a sleep state.

16. A method, comprising:
calculating, by executing an instruction with programmable circuitry, an initial scale factor of an input and parameters of a floating point neural network;
applying, by executing an instruction with the programmable circuitry, the initial scale factor to the input and the parameters to obtain a plurality of scaled values, and to round the plurality of scaled values to integer form to quantize the floating point neural network;
deriving, by executing an instruction with the programmable circuitry, second scale factors for corresponding arcs of a graph of integer neural network circuitry by traversing the graph;
updating, by executing an instruction with the programmable circuitry, a third scale factor of a first outgoing arc of a summation node to be a first input scale factor of a first incoming arc of a plurality of incoming arcs of the summation node;
updating, by executing an instruction with the programmable circuitry, a fourth scale factor of a second outgoing arc of a multiplication node, the fourth scale factor being a product of second input scale factors along a second incoming arc of the multiplication node;
updating, by executing an instruction with the programmable circuitry, a fifth scale factor of a third outgoing arc of a convolution node, the fifth scale factor being a product of third input scale factors along a third incoming arc of the convolution node;
re-quantizing, by executing an instruction with the programmable circuitry, a terminal data node along the plurality of incoming arcs of the summation node to match an upstream scale factor;
stopping, by executing an instruction with the programmable circuitry, a traversal of a current arc after detection of a mapping node along the plurality of incoming arcs of the summation node; and
processing, by the integer neural network circuitry, an input signal from a sensor based on at least one of the third scale factor, the fourth scale factor, or the fifth scale factor.

17. The method of claim 16, further including, after a change of a sixth scale factor of the first incoming arc to the summation node, traversing remaining incoming arcs of the plurality of incoming arcs to the summation node backwards.

18. The method of claim 16, further including updating the fourth scale factor of the multiplication node by propagating the fourth scale factor forward along an output arc.

19. The method of claim 16, further including updating the fifth scale factor of the convolution node by propagating the fifth scale factor forward along an output arc.

20. The method of claim 16, further including, after detection of a delay node along an arc of the plurality of incoming arcs of the summation node, propagating a sixth scale factor through the delay node.

21. The method of claim 16, wherein the mapping node is an activation function node and further including selecting a sixth scale factor for an output arc of the activation function node independently of other scale factors.

22. The method of claim 16, wherein re-quantizing of a weight is avoided.

23. The method of claim 16, wherein sixth scale factors used to initially quantize the floating point neural network are stored at a respective node or arc of the graph.

24. The method of claim 16, further including determining the initial scale factor of the input by scanning inputs for a current minimum value, maximum value, and offset value, and determining a dynamic range of the input.

25. The method of claim 16, further including recalculating a scale factor for the corresponding arcs to re-quantize the integer neural network circuitry.

* * * * *